US006996709B2

(12) United States Patent
Arnold et al.

(10) Patent No.: US 6,996,709 B2
(45) Date of Patent: Feb. 7, 2006

(54) METHOD FOR CONFIGURING A CONFIGURABLE HARDWARE BLOCK BY CONFIGURING CONFIGURABLE CONNECTIONS PROVIDED AROUND A GIVEN TYPE OF SUBUNIT

(75) Inventors: Ralf Arnold, Poing (DE); Helge Kleve, Geisenfeld (DE); Christian Siemers, Hildesheim (DE)

(73) Assignee: Infineon Technologies AG, Munich (DE)

( * ) Notice: Subject to any disclaimer, the term of this patent is extended or adjusted under 35 U.S.C. 154(b) by 653 days.

(21) Appl. No.: 09/815,659

(22) Filed: Mar. 23, 2001

(65) Prior Publication Data

US 2002/0010852 A1   Jan. 24, 2002

Related U.S. Application Data

(63) Continuation of application No. PCT/DE99/02878, filed on Sep. 10, 1999.

(30) Foreign Application Priority Data

Sep. 23, 1998   (DE) ................................ 198 43 640

(51) Int. Cl.
   *G06F 9/00*  (2006.01)
(52) U.S. Cl. ........................... 713/100; 716/16; 326/38
(58) Field of Classification Search .................... 713/1, 713/100; 716/16; 326/38
   See application file for complete search history.

(56) References Cited

U.S. PATENT DOCUMENTS 4,870,302 A   9/1989 Freeman
5,034,907 A * 7/1991 Johnson et al. ............. 708/319
5,600,845 A * 2/1997 Gilson .......................... 712/39
5,737,235 A * 4/1998 Kean et al. .................... 716/16
5,946,219 A * 8/1999 Mason et al. .................. 716/16
6,046,603 A * 4/2000 New ............................. 326/38
6,061,367 A   5/2000 Siemers
6,077,315 A * 6/2000 Greenbaum et al. ........ 717/157
6,088,795 A   7/2000 Vorbach et al.
6,553,395 B2 * 4/2003 Marshall et al. ............. 708/232

FOREIGN PATENT DOCUMENTS

DE    44 16 881 C2   11/1994
DE    196 54 846 A1   7/1998
EP    0 825 540 B1    2/1998

OTHER PUBLICATIONS

H. M. Deitel et al., C++ How To Program, 1998, Prentice-Hall Inc., Second Edition, pp. 66-67.*

(Continued)

*Primary Examiner*—Thomas Lee
*Assistant Examiner*—Mark Connolly
(74) *Attorney, Agent, or Firm*—Laurence A. Greenberg; Werner H. Stemer; Ralph E. Locher

(57) ABSTRACT

A method for configuring a configurable hardware block includes implementing commands and/or command sequences of a program to be executed. The implementing step includes ascertaining a given type of subunit of a configurable hardware block, the given type of subunit being required for executing a respective command, selecting, if available, a subunit of the given type of subunit, configuring configurable connections provided around the subunit selected in the selecting step, if the subunit of the given type of subunit is found in the selecting step, and ascertaining configuration data with the step of implementing the commands and/or command sequences. The configurable hardware block is configured by using the configuration data.

20 Claims, 8 Drawing Sheets

OTHER PUBLICATIONS http://www.brainydictionary.com/words/as/ascertain132659.html.*
http://www.dict.org/bin/Dict.*
Wen-Mei W. Hwu et al.: "Compiler Technology for Future Microprocessors", *Proceedings of the IEEE, vol. 83, No. 12, Dec. 1995, pp. 1625-1640.*
Henk Neefs et al.: "A Microarchitecture for a fixed length Block Structured instruction set Architecture", *Proceedings of the Eighth IASTED International Conference on Parallel and Distributed Computing and Systems, IASTED/ACTA Press, 1996, pp. 1-6.*
Richard H. Littin et al.: "Block Based Execution and Task Level Parallelism", *Proceedings of the 3$^{rd}$ Australasian Computer Architecture Conference, ACAC'98, Perth, Feb. 2-3, 1998, Australian Computer Science Communications, vol. 20, No. 4, pp. 57-66.*

* cited by examiner

FIG 1A

Normal Commands

| Destination-Register | Source-Register 1 | Source-Register 2 | Mnemonic | 0 |
|---|---|---|---|---|
| kd-Bits | ks1-Bits | ks2-Bits | m-Bits | |

FIG 1B

Conditional Commands

| Destination-Register | Source-Register 1 | Source-Register 2 | Mnemonic | Condition Flag |
|---|---|---|---|---|
| kd-Bits | ks1-Bits | ks2-Bits | m-Bits | p-Bits |

FIG 1C pxx Commands

| Destination-Flag | Source-Register 1 | Source-Register 2 | Mnemonic | 0 |
|---|---|---|---|---|
| p-Bits | ks1-Bits | ks2-Bits | m-Bits | |

FIG 1D loopxx-Commands

| 0 | Source-Register 1 | Source-Register 2 | Mnemonic | 0 |
|---|---|---|---|---|
| | ks1-Bits | ks2-Bits | m-Bits | |

| Config-Bits | Config-Index | Part-Number | Comple-mentary | Counter_Up | No_Entry |
|---|---|---|---|---|---|

| 0 | 0 | 0 | 0 | 0 | 1 |
|---|---|---|---|---|---|

METHOD FOR CONFIGURING A CONFIGURABLE HARDWARE BLOCK BY CONFIGURING CONFIGURABLE CONNECTIONS PROVIDED AROUND A GIVEN TYPE OF SUBUNIT

CROSS-REFERENCE TO RELATED APPLICATION

This application is a continuation of copending International Application No. PCT/DE99/02878, filed Sep. 10, 1999, which designated the United States.

BACKGROUND OF THE INVENTION

FIELD OF THE INVENTION

The invention relates to a method for configuring a configurable hardware block.

Such a method is for example required for configuring the so-called "s-unit" (s-paradigm unit) in a so-called ">S<puter." An >S<puter is a program-controlled unit which is capable of executing more than one command per processor clock cycle, particularly as a result of the use of a configurable hardware block in the part which processes the commands.

Such an >S<puter is for example described in European Patent Application EP 0 825 540 A1 which corresponds to U.S. Pat. No. 6,061,367.

The basic structure of an >S<puter is shown in FIG. 11 and is described below with reference to the figure.

It should be noted that the >S<puter, in particular its part which processes the commands, is shown and described only in part (only to the extent significant for the configurable hardware blocks considered in more detail in the present case, and for their configuration).

The >S<puter shown in FIG. 11 includes a predecode unit 1, an instruction buffer 2, a decode, rename & load unit 3, the aforementioned s-unit 4, a data cache 5 and a memory interface 6, the s-unit 4 including a programmable structure buffer 41, a functional unit with programmable structure 42, an integer/address instruction buffer 43 and an integer register file 44.

The particular feature of the >S<puter is, in particular, its s-unit 4, more precisely the functional unit 42 thereof. The s-unit 42 is a piece of configurable hardware which, on the basis of commands or command sequences which are to be executed by the >S<puter, can be dynamically configured such that it is able to execute the actions and operations prescribed by the commands or command sequences.

Instructions (in more precise terms, code data representing instructions) which are to be executed by the >S<puter are passed from a memory (not shown) via the memory interface 6 into the predecode unit 1, where they are predecoded; in this regard, the code data may have information, for example, added to them which simplifies later decoding in the decode, rename & load unit 3. The code data are then passed via the instruction buffer 2 into the decode, rename & load unit 3, where execution of the commands represented by the code data is prepared. This preparation includes decoding the code data, configuring or structuring the functional unit 42, initializing or managing the integer register file 44, and starting the functional unit 42 which has been configured as desired.

The functional unit 42 is structured or configured using configuration data which represent the desired configuration and are written to the programmable structure buffer 41 by the decode, rename & load unit 3. These configuration data representing the desired configuration are created in the decode, rename & load unit 3; alternatively, they may already be contained in coded form in the code data.

The functional unit 42 is configured to read out data from the register file 44 and/or the data cache 51 to process the data which have been read out arithmetically and/or logically, and to write data representing the result of the processing to the register file 44 and/or to the data cache 5.

When the register file 44 is initialized in a suitable manner and when the functional unit 42 is configured in a suitable manner, operation of the functional unit 42 carries out the operations which need to be effected through execution of the commands which were the basis for the register file 44 being initialized and for the functional unit 42 being configured.

It is known to be significantly faster for an appropriately configured piece of hardware (the functional unit 42) to carry out the actions which need to be effected through execution of instructions than for the commands to be executed in the "normal" arithmetic and logic units (ALUs) of conventional program-controlled units. This is particularly true when the hardware (the functional unit 42) is configured such that its operation permits a result to be obtained which is based on the execution of a plurality of successive commands (of a macro command including a plurality of commands).

For further details regarding the structure, function and manner of operation of >S<puters and the configurable hardware they contain, reference is made to the aforementioned European Patent Application EP 0 825 540 A1.

For the sake of completeness, it should be pointed out that not all actions which need to be effected by the commands which are to be executed by the >S<puter can be executed by the functional unit 42. Commands such as, in particular, commands used for program sequence control and control flow control, such as branch, jump, no-operation, wait and stop commands, are generally executed in the conventional manner.

Nevertheless, the use of configurable hardware blocks such as the functional unit 42 generally allows a higher number of actions which need to be effected by executable commands to be executed per unit time than is the case with conventional program-controlled units, that is to say it is possible for more than one command to be processed per processor clock cycle.

It is naturally a prerequisite for the hardware blocks to be configured quickly and used efficiently.

SUMMARY OF THE INVENTION

It is accordingly an object of the invention to provide a method for configuring a configurable hardware block which ensures that hardware blocks can be configured quickly and simply and can be used efficiently for any desired application.

With the foregoing and other objects in view there is provided, in accordance with the invention, a method for configuring a configurable hardware block, the method includes the steps of:

(a) implementing commands and/or command sequences of a program to be executed, the implementing step includes ascertaining a given type of subunit of a configurable hardware block, the given type of subunit being required for executing a respective command; selecting, if available, a subunit of the given type of subunit; and configuring configurable connections provided around the subunit selected in the selecting step, if the subunit of the given type of subunit is found in the selecting step;

(b) ascertaining configuration data with the step of implementing the commands and/or command sequences; and (c) configuring the configurable hardware block by using the configuration data.

In other words, the hardware block is configured using configuration data which result from implementation of commands or command sequences of a program which is to be executed, and implementation of the commands or command sequences involves the following steps being carried out:

the type of configurable hardware block subunit which is required for executing a respective command is ascertained, a subunit of the type ascertained beforehand which is still not being used otherwise is selected and—provided that it has been possible to find such a subunit—, configurable connections provided around the selected subunit are configured.

Such a procedure allows hardware blocks in need of configuration to be configured as desired under any circumstances with a minimum of effort. In this context, configuration is carried out very quickly and makes optimum use of the components of the hardware block; hardware blocks configured in this manner can be used very efficiently.

According to another mode of the invention, the implementing step is started with a first command of a command block having only one entry point and one exit point.

Another mode of the invention includes the step of automatically ending the implementing step when a last command in a command block having only one entry point and one exit point has been implemented.

Another mode of the invention includes the step of performing the implementing step on a hyperblock basis.

Yet another mode of the invention includes the step of automatically ending the implementing step if a hardware block component required for the implementing step is not available or no longer available.

Another mode of the invention includes the step of assigning virtual units to functionally configurable physical subunits of the configurable hardware block, the virtual units representing functions which can be imparted to the functionally configurable physical subunits by respectively configuring the functionally configurable physical subunits.

A further mode of the invention includes the step of entering the virtual units of all functionally configurable physical subunits of the configurable hardware block in a record selected from the group consisting of a table and a list.

Another mode of the invention includes the step of providing the record with entries including information about associations between the functionally configurable physical subunits and the virtual units respectively assigned thereto.

Yet another mode of the invention includes the step of providing the record with entries including information about how the functionally configurable physical subunits need to be configured for imparting the functions represented by the virtual units.

Another mode of the invention includes the step of selecting a physical subunit required for executing a command by searching for a virtual unit of a required type.

Another mode of the invention includes the step of ensuring that a virtual unit of a required type selected for a use and that virtual units associated with a same physical subunit as the virtual unit selected for the use can no longer be selected for use in subsequent implementations.

A further mode of the invention includes the step of checking whether a source, selected from the group consisting of a data source and a signal source and the source being defined by a command to be implemented, is a memory area previously having information written thereto by subunits of the configurable hardware block, and performing the checking step when configuring the configurable connections provided around the subunit selected in the selecting step, for connecting the subunit to the source.

Yet a further mode of the invention includes the step of using a given one of the subunits as the source, if the source defined by the command to be implemented is found to have had information written thereto by the given one of the subunits of the configurable hardware block.

Another mode of the invention includes the step of checking whether a destination, selected from the group consisting of a data destination and a signal destination and the destination being defined by a command to be implemented, is a memory area previously having information written thereto also by a further subunit of the configurable hardware block, and performing the checking step when configuring the configurable connections provided around the subunit selected in the selecting step, for connecting the subunit to the destination.

Another mode of the invention includes the step of using another memory area as the destination, if the destination defined by the command to be implemented is found to be a memory area which also has information written thereto by another subunit of the configurable hardware block.

Another mode of the invention includes the step of carrying out a register renaming process, as used for superscalar processors, for memory areas representing a same destination.

Another mode of the invention includes the step of carrying out a search for a memory area designated for constants and containing a given constant, if a command to be implemented includes the given constant; and using the memory area designated for constants as a source selected from the group consisting of a data source and a signal source.

Yet another mode of the invention includes the step of storing the given constant in a new memory area designated for constants, if the given constant is not already stored in existing memory areas designated for constants; and using the new memory area as the source.

Another mode of the invention includes the step of attempting to form pseudo-hyperblocks including a plurality of hyperblocks when implementing commands as configuration data.

Another mode of the invention includes the step of forming the pseudo-hyperblocks by using an if-conversion.

Another mode of the invention includes the step of implementing commands as configuration data on a pseudo-hyperblock basis if possible.

With the objects of the invention in view, there is further provided a method for configuring a configurable hardware block, the method includes the steps of:

attempting to form pseudo-hyperblocks including a plurality of hyperblocks when implementing commands as configuration data; and configuring a configurable hardware block by using the configuration data.

Other features which are considered as characteristic for the invention are set forth in the appended claims.

Although the invention is illustrated and described herein as embodied in a method for configuring a configurable hardware block, it is nevertheless not intended to be limited to the details shown, since various modifications and structural changes may be made therein without departing from the spirit of the invention and within the scope and range of equivalents of the claims.

The construction and method of operation of the invention, however, together with additional objects and advantages thereof will be best understood from the following description of specific embodiments when read in connection with the accompanying drawings.

BRIEF DESCRIPTION OF THE DRAWINGS

FIGS. 1A to 1D show an example of standard command formats which the commands to be implemented in the example under consideration should have or into which they should preferably be transformed before the start of an implementation;

DESCRIPTION OF THE PREFERRED EMBODIMENTS

In order to better explain the invention, the basic structure of a hardware block which is to be configured is described first and then the methods for configuring the hardware block are described.

Figure 11:
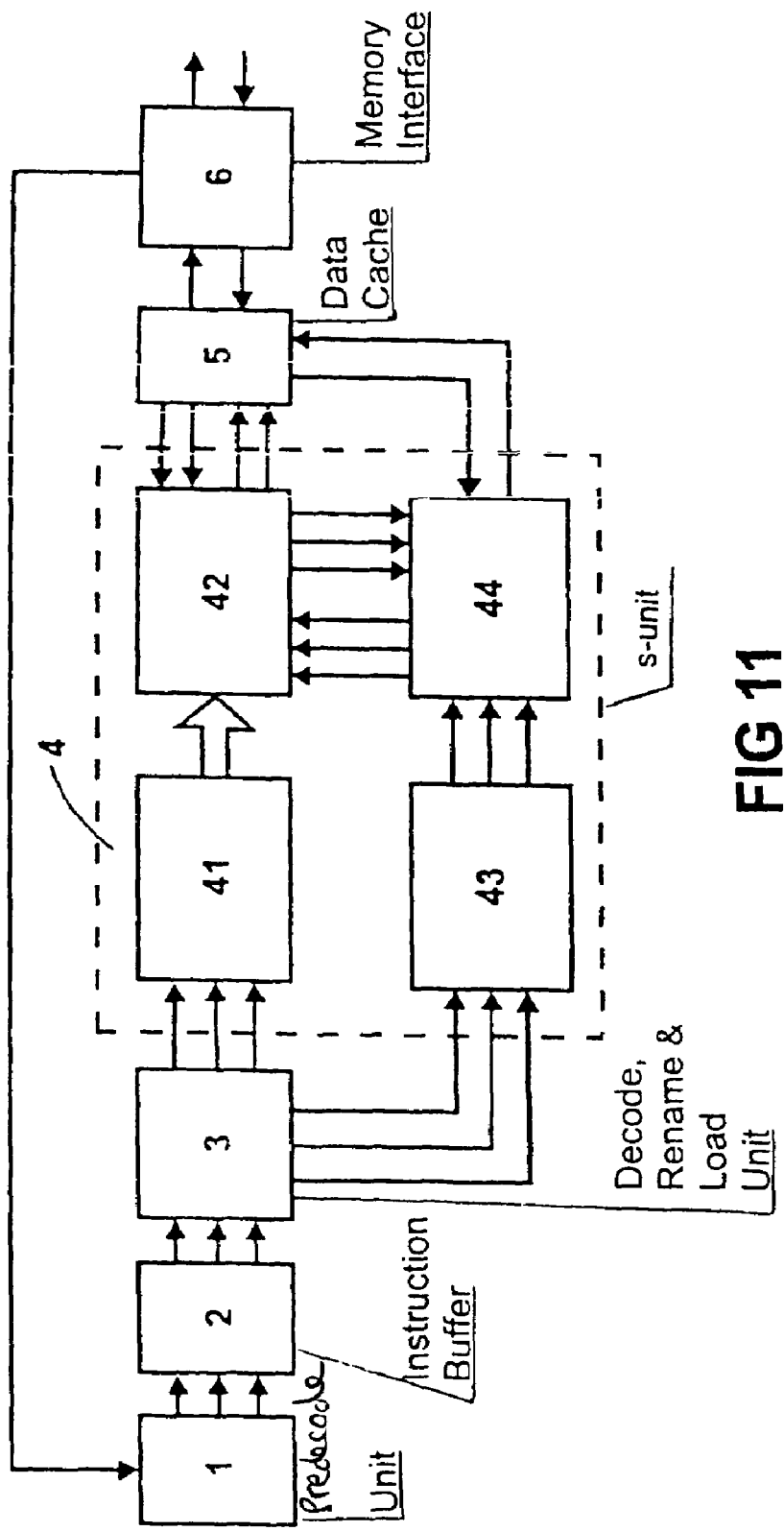
FIG. 11 is a block diagram of the basic structure of an >S<puter.
Figure 12:
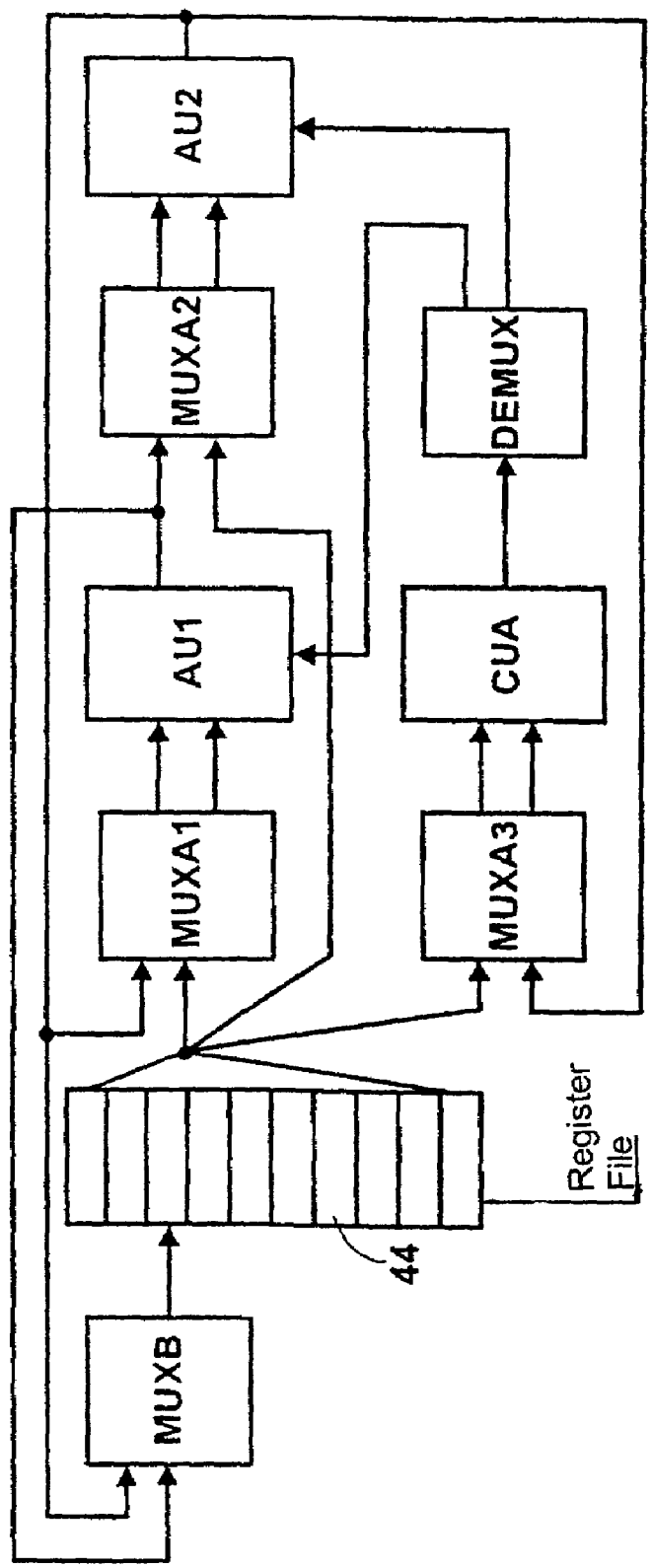
FIG. 12 is a block diagram of the basic structure of a hardware block of the type considered in more detail in the present case.

The basic structure of such a hardware block is shown in FIG. 12. The hardware block shown is configured to read out, depending on its configuration, data which are stored in a memory device, to process the data which have been read out arithmetically and/or logically, and to write data representing the result of the processing into the memory device; by way of example, the hardware block may be used as the functional unit 42 of the >S<puter shown in FIG. 11.

The memory device from which the configurable hardware block reads out data and into which the hardware block writes data can be provided inside or outside the hardware block; in the example considered in the present case, the memory device is formed by the register file 44 of the >S<puter shown in FIG. 11. The hardware block is an asynchronous switching network between the outputs and inputs of the memory device; the constituent parts of the hardware block are coupled to one another asynchronously.

The memory device can preferably be initialized from outside the hardware block before the hardware block is started up; it would also be conceivable for the hardware block to cause or carry out initialization of the memory device itself.

The hardware block shown in FIG. 12 has one or more arithmetic units AU1, AU2, one or more comparison units CU, one or more multiplexers of a first type MUXA1, MUXA2, MUXA3, one or more multiplexers of a second type MUXB, and one or more demultiplexers DEMUX.

In the example under consideration, the arithmetic units AU1, AU2 have two input connections, an output connection and a control connection. The arithmetic units AU1, AU2 have the task of arithmetically and/or logically processing the input signals which are input via their input connections. The operations which can be carried out by the arithmetic units AU1, AU2 may be firmly prescribed or may be individually settable (configurable); they include, in particular, arithmetic operations such as addition, subtraction, multiplication, division etc., logic functions such as AND functions, OR functions, inversion, complementation etc., arithmetic and logic shift operations, and data transfers (switching through one of the signals which have been input to the output connection). The arithmetic units AU1, AU2 cannot be equated to the arithmetic and logic units (ALUs) in conventional program-controlled units such as microprocessors, microcontrollers etc.; the operations which they are able to execute are limited, which means that the structure of the arithmetic units AU1, AU2 can remain comparatively simple. The control connections of the arithmetic units AU1, AU2 can be used to stipulate whether or not the arithmetic unit in question carries out the operation which it is intended to carry out. This permits practical implementation of commands whose execution depends on the existence of a particular condition. The condition may, by way of example, be the state of a particular flag: if the flag is set, the task assigned to the arithmetic unit in question (for example addition) is carried out, otherwise it is not (or vice versa). Such commands, which are called "conditioned commands" below, make it possible to eliminate the conditional jump commands, which are difficult to handle; these are described more accurately at a later point.

The comparison unit CU in the example under consideration has two input connections and an output connection. The comparison unit CU has the task of subjecting the signals or data applied to its input connections to comparison operations. The operations which the comparison unit CU is able to carry out may be firmly prescribed or may be individually settable (configurable); by way of example, they include greater than, greater than/equal to, less than, less than/equal to, equal to and not equal to comparisons, and checks for true and false. The output connection of the comparison unit CU is connected to the control connections of the arithmetic units AU1, AU2 via the demultiplexer DEMUX, which is described more accurately below. The result of the operation carried out in the comparison unit CU thus governs whether or not the arithmetic units AU1, AU2 carry out the operation which they are intended to carry out.

The multiplexers of the first type MUXA1, MUXA2, MUXA3, the multiplexer of the second type MUXB and the demultiplexer DEMUX are used for selecting the data and/or signal sources and the data and/or signal destinations. More precisely, the multiplexer MUXA1 is used for selecting the sources of the data and/or signals supplied to the input connections of the arithmetic unit AU1 (possible data and/or signal sources in the example under consideration are the register file 44 and other arithmetic units), the multiplexer MUXA2 is used for selecting the sources of the data and/or signals supplied to the input connections of the arithmetic unit AU2 (possible data and/or signal sources in the example under consideration are the register file 44 and other arithmetic units), the multiplexer MUXA3 is used for selecting the sources of the data and/or signals supplied to the input connections of the comparison unit CU (possible data and/or signal sources in the example under consideration are the register file 44 and the arithmetic units), the multiplexer MUXB is used for selecting the sources of the data and/or signals supplied to the register file (possible data and/or signal sources in the example under consideration are the arithmetic units and/or the register file itself), the demultiplexer DEMUX is used for selecting the destination or destinations for the data and/or signals which are output by the comparison unit CU (possible data and/or signal destinations in the example under consideration are the arithmetic units).

The multiplexers of the first type have a plurality of input connections and two output connections, the multiplexers of the second type have a plurality of input connections and an output connection, and the demultiplexer has an input connection and a plurality of output connections.

In FIG. 12, the multiplexers and the demultiplexer have control connections (not shown) which can be used to set which input data and/or signals are switched through to which output connections. The number of control connections depends on the required number of different allocation combinations; with 32 input connections and two output connections, for example, 10 control connections are necessary in order to be able to switch through signals and/or data applied to arbitrary input connections to arbitrary output connections. When the hardware block is used as functional unit 42 in the >S<puter shown in FIG. 11, the control signal connections are preferably connected to the programmable structure buffer 41, so that the configuration data written into the latter can be used essentially directly for multiplexer driving. The configuration data stored in the programmable structure buffer 41 preferably also include the configuration data for stipulating the respective function of the arithmetic units AU1, AU2 and the comparison unit CU.

The arithmetic units AU1, AU2, the comparison unit CU, the multiplexers of the first type MUXA1, MUXA2, MUXA3, the multiplexer of the second type MUXB and the demultiplexer DEMUX permit the hardware block to read out data which are stored in a memory device (in the register file 44), to process the data which have been read out arithmetically and/or logically, and to write data representing the result of the processing into the memory device (the register file 44).

The hardware block shown in FIG. 12 and described with reference thereto is intended only to explain the fundamental structure. In practice, the arithmetic units, the comparison units, the multiplexers and the demultiplexers will be provided in much greater number than is the case in the example shown in FIG. 12. The hardware block is preferably configured such that, normally, all the operations to be effected by a so-called hyperblock (described in more detail at a later point) can be programmed into it on one occasion.

The data and/or signal paths provided in the hardware block can be formed by individual lines or by buses, and it may prove to be advantageous if the individual subunits of the hardware block or the bus system make(s) it possible to configure how many and/or which bus lines need to be taken into account.

A hardware block of the type shown in FIG. 12 can be configured on the basis of commands or command sequences. If commands or command sequences are implemented as appropriate hardware block structures, then the hardware block configured in this way can be used as a sequence unit for sequential command sequences. This form of hardware block configuration is also called structure procedural programming below.

The starting point for structure procedural programming may be a program written in a high level language, such as C, C++ etc. This program is translated by a compiler, and the code obtained in this process is implemented as structure information (preferably on a hyperblock basis), on the basis of which the hardware block in need of configuration can be configured. What is meant by hyperblock will be described more accurately at a later point.

The starting point for structure procedural programming may, of course, also be a program written in assembler, or another program. The manner of programming (functional, imperative, object-oriented, etc.) is likewise not subject to any limitations.

It is found to be advantageous if the code which is to be implemented as the structure information, that is to say the machine commands produced by the compiler or in another way, includes only particular machine command types, namely unconditioned commands, conditioned commands, predicate commands and loop commands. It is then generally possible to form command blocks which are particularly long (contain a particularly large number of commands) and have just one entry point and just one exit point. The ability for the longest possible command blocks having just one entry point and just one exit point to be generated is very significant, because commands belonging to one and the same command block, and indeed only such commands, can be handled as one unit (as a macro instruction composed of a plurality of commands) which can be implemented as a common hardware block structure and can be executed on one occasion. If the configuration of a hardware block is in each case based on exactly one such a unit (and if the hardware block is large enough to be configurable in this way), then the number of restructuring operations or reconfiguration operations for the hardware block which are required for processing a program can be reduced to a minimum. The command blocks which are currently favored for generation and which can also be formed by the command groups mentioned in the present case are the aforementioned hyperblocks.

Hyperblocks are distinguished, in particular, in that conditional jump commands are eliminated using so-called if conversion, which is described in more detail below.

For further details on the hyperblocks, other command blocks and associated topics, reference is made to Wen-Mei W. Hwu et al.: "Computer Technology for Future Microprocessors", Invited Paper in Proceedings of the IEEE, Vol. 83 (12), December 1995, Special Issue on Microprocessors, pages 1625 to 1640, Henk Neefs, Jan van Campenhout: "A Microarchitecture for a Fixed Length Block Structured Instruction Set Architecture", Proceedings of the Eighth IASTED International Conference on Parallel and Distributed Computing and Systems, pages 38 to 42, IASTED/ACTA Press, 1996, and Richard H. Littin, J. A. David McWha, Murray W. Pearson, John G. Cleary: "Block Based Execution and Task Level Parallelism", in: John Morris (Ed.), "Computer Architecture 98", Proceedings of the 3rd Australasian Computer Architecture Conference ACAC'98, Perth, 2–3 Feb. 1998, Australian Computer Science Communications, Vol. 20, No. 4, pages 57 to 66, Springer, Singapore.

The aforementioned unconditioned commands are commands for the unconditional processing of data, including copying data from one memory area to another (from one register to another). These commands are called normal commands below. They include arithmetic and logic combinations of data to form new values, and the so-called move commands for copying register contents. The general format for these commands is: <mnemonic> <destination register>, <source register 1>, <source register 2>. To carry out the operation specified by such a command, an arithmetic unit of the hardware block is normally required.

The conditioned commands are commands for processing data when a particular condition exists. The actions to be carried out by these commands correspond to the actions which can be carried out by the normal commands, but performance of the actions in question depends on a predetermined condition. If the condition has been satisfied, the action specified by the command is carried out, otherwise nothing is carried out (the command in question then acts as a NOP command). These commands are called conditional commands below. The general format for these commands is: <mnemonic>p <destination register>, <source register 1>, <source register 2> <p-flag>, where the "p" at the end of the mnemonic signals the dependency of the command execution on a condition, and where the condition is defined by a particular state of a particular flag (the "p-flag"). To carry out the operation specified by such a command, an arithmetic unit of the hardware block is normally required; checking the condition requires a comparison unit whose output can be connected to the control input of the arithmetic unit.

The predicate commands are commands for stipulating the state of the condition flag (the p-flag) used in the conditional commands. In this context, the state is stipulated during program execution on the basis of a comparison between two data items. These commands are called pxx commands below. The general format for these commands is: pxx <source register 1>, <source register 2>, <p-flag>, where xx specifies the comparison operation to be performed and can be replaced by gt (greater than), ge (greater than or equal to), eq (equal to), ne (not equal to), le (less than or equal to) or lt (less than). The pxx commands are comparable to the usual branch commands and are used for replacing the latter with the use of so-called if conversion (in this regard, see the aforementioned paper by Wen-Mei W. Hwu et al).

The loop commands are commands used for loop repetition at the end of a hyperblock. They cause a return to the start of the hyperblock in question if a condition specified in the command has been satisfied; they can cause a READY signal to be generated if the condition is no longer satisfied. The condition is defined by a particular result of a comparison operation. The general format for these commands is: loopxx <source register 1>, <source register 2>, where xx specifies the comparison operation which is to be carried out.

As can be seen from the formats of the command types cited, the data and/or signal sources and data and/or signal destinations used are registers in each case. This is found to be particularly advantageous when using hardware blocks of the type shown in FIG. 12, because the registers (the register file 44) can be accessed particularly efficiently. In principle, however, it would also be possible to permit commands whose data and/or signal sources and data and/or signal destinations are not registers.

Many programs or at least large parts thereof can be written exclusively using the command types explained above or can be translated into such programs and therefore executed entirely in a hardware block of the type shown in FIG. 12. The use of such hardware blocks in program-controlled units can therefore increase their performance considerably. Hardware blocks of the type shown in FIG. 12 can also be used as independent devices outside program-controlled units, however, and can then likewise be configured on the basis of commands or command streams.

The following text now describes the configuration of a hardware block, which allows the hardware block to carry out arithmetic and/or logic operations or operation sequences prescribed by commands or command sequences.

The hardware block, more precisely its subunits (arithmetic units, comparison units, multiplexers, demultiplexer . . . ) and the connections between the subunits in the example under consideration are configured by configuration data (configuration bits) representing the desired configuration. Accordingly, the object of the configuration method described below is to generate or vary the configuration data or a bit stream containing these configuration data on the basis of the commands or command sequences underlying the hardware block configuration.

In the example under consideration, it is assumed that only the aforementioned types of commands, i.e. normal commands, conditional commands, pxx commands and loopxx commands, are implemented; other commands need to be executed elsewhere, for example by the execution unit in a conventional program-controlled unit.

To implement the implementable commands as appropriate hardware block structures, it may prove to be advantageous if the commands have a standard format shown by way of example in FIGS. 1A (normal commands), 1B (conditional commands), 1C (pxx commands) and 1D (loopxx commands) from the outset, or are put into such a format by a decoder.

Particularly if the subunits of the hardware block are configurable, these (physical) subunits have associated logical and virtual units, with the virtual units indicating the various functions of the physical subunits. The physical subunit "first arithmetic unit AU1" can—provided that it is configurable—have the virtual units adder, subtracter etc., for example, associated with it. A virtual unit is associated with precisely one physical subunit, but a physical subunit can have a plurality of virtual units associated with it. All the virtual units are preferably managed in a table or list. The respective entries contain not only information on the virtual units themselves but also information about which physical subunit has the respective virtual units associated with it, using which configuration bits and how this physical subunit needs to be configured, if appropriate, in order to accord it the function represented by the virtual unit.

Preferably, an entire hyperblock is implemented as one hardware block structure.

A command is implemented as hardware block structuring information essentially in three phases.

In the first phase, the type of virtual unit (adder, subtracter, multiplier etc.) required for executing the instruction in question is ascertained, and whether such a virtual unit is still available. If a virtual unit of the required type is still free, this unit or one of these units is selected for executing the instruction in question. Configuration or preparation therefor is then carried out and the physical subunit associated with the selected virtual unit is reserved. For the purposes of configuration, the configuration bits associated with the physical subunit in question are simply set or reset. This poses no problems, because the information regarding which physical subunit has the selected virtual unit associated with it, via which configuration bits and how this physical subunit is to be configured, if appropriate, is, of course, managed together with the virtual unit. The physical subunit associated with the selected virtual unit needs to be reserved in order to prevent it from being possible for the physical subunit in question to be used more than once. In the example under consideration, this is achieved by virtue of the fact that, whenever a physical subunit has been allocated for a particular purpose, all the virtual units associated with the physical subunit in question are disabled.

With pxx commands, it may be necessary, depending on the configuration of the hardware block, to select a quite particular physical subunit (comparison unit) on the basis of the p-flag.

In the case of conditional commands, the p-flag has an effect on the selection of the virtual/physical unit(s) only if particular instructions are possible only with particular flags, that is to say full orthogonality does not exist in the partial command set for conditional commands.

In the second phase of hardware block configuration, the multiplexers connected upstream and/or downstream of the selected physical subunits are configured in order to set the data and/or signal sources and the data and/or signal destinations as per the stipulations in the instructions which are to be implemented. The multiplexers and the format of the instructions which are to be implemented are, ideally, matched to one another such that those parts of the instructions which stipulate the data and/or signal sources, and those which stipulate the data and/or signal destinations, can be adopted unchanged as the configuration bits which configure the multiplexers. If—for whatever reason—this is not possible, the configuration bits configuring the multiplexers can be taken from a table, for example, which stores the association between the parts of the instructions which stipulate the data and/or signal sources and the data and/or signal destinations and the configuration bits which configure the multiplexers. The configuration which is required in order to produce a connection to a particular data and/or signal source and/or to a particular data and/or signal destination is preferably the same for all multiplexers.

Separate treatment is necessary if at least some of the data on which the operation which is to be carried out is based include a constant which is contained in the instruction code. In this case, it is necessary for a free (constant) register to be sought, this register to be used as data and/or signal source, and the constant contained in the instruction code to be written to the selected register before the UCB (unit control block) is started up.

In the example under consideration, a prior check is carried out to determine whether the constant in question is already stored in a (constant) register, i.e. a register for constants. If this reveals that a (constant) register containing the constant already exists, then this already existing (constant) register is used as data and/or signal source.

It should also be noted that the instructions which are to be implemented have different amounts of data and/or signal sources and data and/or signal destinations, and/or depend on conditions, and to this extent the individual instructions need to be treated separately.

Registers used as a data and/or signal destination are, incidentally, marked as used, since dual use is not permissible within a hyperblock and needs to be prevented through the use of so-called (runtime) register naming, a technology which is known from superscalar architectures.

After this second phase (which is common for all commands), specific substeps are added for individual command types, the substeps arising from the respective particular features.

Amongst other things, for conditional commands, it is necessary to ascertain the comparison unit which is checking for the existence of the condition and to switch its output signal via the associated demultiplexer to the arithmetic unit which is carrying out the operation. It is also necessary to take into account what type of condition is involved.

In the case of conditional move commands, it is additionally necessary to ensure that the content of the target register is not modified if the command is not executed.

After the second phase of configuring the hardware block, it would be possible for to end the configuration process and to start the hardware block. However, this preferably does not take place until after the third phase (described below) has been carried out.

In this third phase of hardware block configuration, so-called data forwarding is implemented. In this context, the data and/or signal sources used are not only the data and/or signal sources indicated in the instructions, but also, where possible, the physical subunit to which the relevant data and/or signal source within the respective hyperblock had to write information previously. This is found to be advantageous in two respects: first, because fewer registers may be required (if the data and/or signal source indicated in the instruction is not used as such, it also need not have information written to it and may possibly be dispensed with completely), and, secondly, because the data required are available earlier when picked up from the subunit (for example an arithmetic unit) generating them than if they first need to be written to a register and picked up from there. Data forwarding can be used for all commands and is found, on average, to be an enormous advantage.

The method just described briefly in words can also be illustrated through the use of its software and hardware implementation options and using mathematical notation.

First, a software implementation using an illustration resembling C++ will be described. In the example under consideration, the information relating to the hardware block configuration data is managed through the use of classes.

In the example under consideration, the class for a virtual unit is defined as follows:

```
class clVirtualUnit {
    private:  unsigned int uiPhysicalPartNumber;
              unsigned int uiMnemonicType;
              BOOL bIsConfigurable;
              unsigned int uiConfBits;
              unsigned int uiConfBitsIndex;
```

-continued

```
            BOOL bTwoSourceRegs;
            unsigned int uiSrcMultiplexNumber[2];
            unsigned int uiSrcMultiplexIndex[2];
            BOOL bDestinationReg;
            unsigned int uiDestMultiplexNumber;
            unsigned int uiDestMultiplexIndex;
            BOOL bIsUsed;
            BOOL bSecondPIsUsed;
            BOOL bIsConstantRegister;
            unsigned int uiConstantIndex;
            unsigned int uiConstantValue;
   public:  unsigned int uiGetPartNumber(void);
            unsigned int uiGetMnemonicType(void);
            BOOL bIsUnitConfigurable(void);
            unsigned int uiGetConfBits(void);
            unsigned int uiGetConfBitsIndex(void);
            BOOL bHasTwoSourceRegs(void);
            unsigned int uiGetSrcMultiplexNumber
                                        (unsigned int);
            unsigned int uiGetSrcMultiplexIndex
                                        (unsigned int);
            BOOL bHasDestinationReg(void);
            unsigned int uiGetDestMultiplexNumber (void);
            unsigned int uiGetDestMultiplexIndex (void);
            void vFreePart(void);
            BOOL bMarkUsedPart(void);
            BOOL bMarkSecondUsedFlag(void);
            BOOL bGetIsUsed(void);
            BOOL bGetTsUsedSecondFlag(void);
            POOL bIsConstantRegister (void);
            POOL bSetConstantValue(void);
            unsigned int uiGetConstantValue(void);
            unsigned int uiGetConstantIndex(void);
}
```

The data and methods contained in the class are used for modeling a microarchitecture.

Among the data, the meanings are as follows:

uiPhysicalPartNumber: This variable contains a unique number for the physical subunit within the hardware block.

uiMnemonicType: This variable contains a coded form of the link type associated with the respective virtual unit.

bIsConfigurable: This flag indicates whether the associated physical subunit needs to be configured in order to obtain this virtual unit.

uiConfBits: If bIsConfigurable is== TRUE, the associated configuration bits are stored here in order to configure the physical subunit for exactly this function.

uiConfBitsIndex: If bIsConfigurable is== TRUE, the index for storing the configuration bit in the bit stream is stored at this point.

bTwoSourceRegs: This flag is set to TRUE if two source registers need to be indicated for the command in question, otherwise it is set to FALSE.

uiSrcMultiplexNumber [2]: If there are two source registers, the physical numbers of the associated multiplexers are stored in this variable; possibly, only the variable with the index 0 is valid.

uiSrcMultiplexIndex [2]: This stores the indices of the multiplexers for the source registers.

bDestinationReg: This flag is set to TRUE if a destination register (not flag!) needs to be indicated for the command in question, otherwise it is set to FALSE.

uiDestMultiplexNumber: This stores the physical number of the associated multiplexer for the destination register.

uiDestMultiplexIndex: This stores the index of the multiplexer for the destination register.

bIsUsed: This flag stores whether this virtual (and hence at the same time the physical) subunit has been used. If this flag is set to TRUE, this means that this subunit can no longer be used (apart from for the conditional move commands (movep)).

bSecondPIsUsed: For the special case of the movep commands, this flag stores the second use of a p-flag, including the comparison. If bIsUsed and bSecondPIsUsed have been set to TRUE, the dynamic path multiplexer (AU) to which a movep command is mapped is disabled for further use.

bIsConstantRegister: This flag indicates that the physical subunit corresponds (TRUE) or does not correspond (FALSE) to a constant register.

uiConstantIndex: In the case of a constant register, the value of the constant which is to be stored and used needs to be entered in the bit stream. In this case, the index in the bit stream is stored in this variable.

uiConstantValue: The value stored in the constant register is additionally stored in this instance variable for further comparisons.

The variables occurring in an instance of this class must all be used at the time at which configuration starts. To this end, methods (not detailed explicitly here) are used which are used in the constructor of a configurable block class or CB class (explained below) in order to write all the information required for implementation into the instance and to set the flags bIsUsed and bSecondPIsUsed to FALSE at the same time. Over the lifetime of this instance, the only things which then change are these two flags, which can have the value TRUE or FALSE assigned to them using predefined methods, and also—in the case of a constant register—the variable uiConstantValue, which buffer stores the current value of the register for further comparisons.

Among the methods of the above-defined class for the virtual units, the meanings are as follows:

unsigned int uiGetPartNumber(void): This method permits read access to the number of the physical subunit associated with the virtual subunit; the number is returned as a return value.

unsigned int uiGetMnemonicType (void): This method permits read access to mnemonic, which can be implemented in the virtual unit.

BOOL bIsUnitConfigurable(void): This method gives TRUE if the physical subunit needs to be configured. Under these circumstances, the entries in uiConfBits and uiConfBitsIndex are valid and can be obtained using the methods uiGetConfBits ( ) and uiGetConfBitsIndex ( ) below. In addition, all other virtual subunits associated with the same physical unit must likewise be disabled. For the return value FALSE, on the other hand, the virtual unit and the physical unit are identical.

unsigned int uiGetConfBits (void): This method reads the configuration bits and returns them as a return value. These values are valid only when bIsConfigurable has the value TRUE.

unsigned int uiGetConfBitsIndex(void): This method reads the index in the bit stream for the configuration bits and returns it as a return value. This value is valid only when bIsConfigurable has the value TRUE.

BOOL bHasTwoSourceRegs (void): Calling this method gives the value TRUE if this operation has two source registers and these need to be entered into the appropriate multiplexers, otherwise the value FALSE is given.

unsigned int uiGetSrcMultiplexNumber (unsigned int): This method gives the number of the physical subunit which represents the multiplexer for the source registers. The call parameter is the index in the array of 2 entries, the index 1 supplying valid values only if the flag bHasTwoSourceRegs has the value TRUE.

unsigned int uiGetSrcMultiplexIndex(unsigned int): This method gives the index for the entry in the bit stream in order to be able to configure the multiplexer for the source registers. The call parameter is the index in the array of two entries, the index 1 supplying valid values only if the flag bHasTwoSourceRegs has the value TRUE.

BOOL bHasDestinationReg (void): Calling this method gives the value TRUE if this operation has a destination register and this needs to be entered into the appropriate multiplexer, otherwise the value FALSE is given.

unsigned int uiGetDestMultiplexNumber (void): This method gives the number of the physical subunit which represents the multiplexer for the destination register. The return value is valid only if the flag bHasDestinationReg has the value TRUE.

unsigned int uiGetDestMultiplexIndex(void): This method gives the index for the entry in the bit stream in order to be able to configure the multiplexer for the destination register. The return value is valid only if the flag bHasDestinationReg has the value TRUE.

void vFreePart(void): This method erases all the use flags by assigning the value FALSE to them. This thus involves write access to the flags.

BOOL bMarkUsedPart(void): The used flag bIsUsed is set to TRUE using this method. The return value is TRUE if the operation was successful, and is FALSE if this element was already being used.

BOOL bMarkSecondUsedFlag(void): The second used flag bSecondPIsUsed is set to TRUE as appropriate. The return value is also TRUE in this case if the operation was successful, and is FALSE if this element was already being used.

BOOL bGetIsUsed(void): This method gives the value of the variable bIsUsed as return value.

BOOL bGetIsUsedSecondFlag(void): This method gives the value of the variable bSecondPIsUsed as return value.

BOOL bIsConstantRegister(void): This method returns TRUE if the virtual subunit corresponds to a constant register, otherwise FALSE is returned.

BOOL bSetConstantValue(void): This method can be used to store the current constant value in the variable uiConstantValue if this virtual unit corresponds to a constant register and the latter has previously not yet been used. The return value is TRUE if successful, otherwise it is FALSE.

unsigned int uiGetConstantIndex(void): This method is used to return the stored constant value.

unsigned int uiGetConstantIndex(void): The index in the bit stream which is required for storing the constant value there is obtained using this method.

For modeling a hardware block (CB), a second class is defined which, amongst other things, contains instances of the class clVirtualUnit and also other variables and methods. For the purposes of simplification, it is assumed that the elements are stored in a static array; a chained list is, of course, likewise conceivable. It should be pointed out at this point that only some of the methods are illustrated for the classes indicated here.

```
class clCB
{
private:  BITFIELD *clbitfield;
          class clVirtualUnit clArrayVirtualUnits
                                            [NUM_OF_PARTS];
public:   clCB();
          void vSetupBitfield(BITFIELD*);
          void vFreeAll(void);
          BOOL bDoAllPhase_1_Parts
                                            (unsigned int, BIT-
                                             FIELD *)
          BOOL bDoCommonPhase_2_Parts (unsigned int,
                                             BITFIELD *,
                                             unsigned int,
                                             unsigned int,
                                             unsigned int);
          void vDataForwarding (unsigned int, unsigned int);
          void vCopyBitfield (BITFIELD *, BITFIELD *);
          unsigned int uiGetMuxCode     (unsigned int,
                                             unsigned int);
          unsigned int uiGetRegPartNumFromCode (unsigned int);
          unsigned int uiGetPartNumFromFlag (unsigned int);
          unsiged int uiGetIndexFromNum (unsigned int);
          unsigned int uiGetPartNumFromBitfield (unsigned int);
          void vSetBitfield (unsigned int, unsigned int,
                                             unsigned int);
};
```

Specifically, the variables and methods of the class clCB have the following meanings:

BITFIELD *clBitfield: This variable corresponds to the bit stream which is to be generated for runtime configuration of the CB.

class clVirtualUnit clArrayVirtualUnits [NUM_OF_PARTS]: This array of instances of the class clVirtualUnit contains all the information for all the virtual units, and hence also for all the physical subunits.

clCB( ): This constructor was set up to clarify what the tasks in this class involve. In a start phase, both the bit field and all instances of the class clVirtualUnit which are brought together in the array clArrayVirtualUnits[ ] need to be initialized. Initialization of the class instances includes, in particular, describing all the configuration data and resetting all the flags, in order to be able to have read access to the necessary data in the operating phase.

void vSetupBitfield(BITFIELD *): In this method, the bit field is provided with all the initial assignments.

void vFreeAll(void): This method is called to erase all the used flags in the array clArrayVirtualUnits[ ].

BOOL bDoAllPhase_1_Parts(unsigned int, BITFIELD *): This method brings together all the parts into phase 1. It is called after a free subunit for holding the mnemonic has been found and contains the marking of all associated virtual units as used, determination of the configuration bits and of the index in the bit stream, and entry into a temporary bit stream. The parameters are the index in the array of the virtual units and the pointer to the temporary bit stream. The return value TRUE indicates a successful phase 1, and FALSE indicates that it has not been successful (for example as a result of insufficient network resources).

BOOL bDoCommonPhase_2_Parts(unsigned int, BITFIELD *, unsigned int, unsigned int, unsigned int): This method brings together the methods which are common to all the command groups. These include the entries for the source and destination registers, including treatment of the constants as input values. The return value is TRUE if successful and FALSE if unsuccessful.

void vDataForwarding(unsigned int, unsigned int): Calculation of data forwarding using all the associated methods is integrated in this method. The procedure concerns the source registers whose physical numbers are transferred to the parameters. Other methods are used to ascertain whether a source register has already been an earlier destination register. If this is the case, the last calculating AU is ascertained from the bit stream and is entered instead of the register.

void vCopyBitField(BITFIELD *, BITFIELD *): This method logically combines the entry in the second bit stream with that in the first using an OR function and stores the result in the first bit stream. As a result of this, the temporary interim result is stored in the bit stream calculated for the later configuration.

unsigned int uiGetMuxCode (unsigned int, unsigned int): This method calculates the configuration bits which need to be loaded into the bit stream for a multiplexer in order to select a physical subunit as source. The parameters in this method are the physical number of the multiplexer and also of the source unit. This method is absolutely necessary for the configuration, since, although the description of the virtual units stores the index of the entry, it does not store the entry itself. This method may be implemented for an entire network as table-supported conversion calculation, possibly without taking into account the multiplexer number, since all multiplexers can be configured in a standard manner in this case. The level of effort required for partial networks needs to be greater in this case; in particular, crosslinking may not be possible. The return value is the configuration bits if successful or an otherwise unused coding if unsuccessful.

unsigned int uiGetRegpartNumFromCode(unsigned int): This method calculates the number of the subunit from the code in the instruction. This can naturally only be done for registers, and, in the case of a constant, the procedure described is integrated in this method, which results in the constant being stored and the physical number of the constant register being returned. The return values are the number of the subunit if successful, otherwise an unused identifier if unsuccessful.

unsigned int uiGetPartNumFromFlag(unsigned int): This method is used to convert a flag number to the number of the physical subunit. The call parameter is the p-field in the instruction format, and the return value is the subunit number or a particular identifier if unsuccessful.

unsigned int uiGetIndexFromNum(unsigned int): This method is used to calculate and return the index in the bit stream for a subunit having a known physical number (as parameter). This calculation can be performed in table form.

unsigned int uiGetPartNumFromBitfield(unsigned int): This method reads the entry in the bit field using the index which is transferred as parameter, and converts the configuration mask obtained back to the physical number of the subunit, which is returned as result. uiGetPartNumFromBitfield is used in data forwarding, where the data path is traced back from an earlier target register to the subunit determining the result so that the data can be used early.

void vSetBitfield(unsigned int, unsigned int, unsigned int): This method is called using three parameters: The index for the entry, the length of the entry and the mask. Calling it effects the entry in the bit field at the appropriate point.

The variables and methods mentioned and explained above produce the pseudocode below for the method for configuring a hardware block of the type illustrated in FIG. 12 (for structure procedural programming) on the basis of commands or command sequences:

```
unsigned int k;
BITFIELD *clTempBitfield;
// 1st phase: Determination of a physical subunit for
// accommodating the link.
// mnemonic present in uiMem
vSetUpBitfield(clTempBitfield);
for (k = 0; k < NUM_OF_PARTS; k++)
{
    if (clArrayVirtualUnits [k] ::uiGetMnemonic() == uiMem
        && clArrayVirtualUnit [k] ::bGetIsUsed() == FALSE)
        break;
}
if(k == NUM_OF_PARTS) // no free link found
    return (FALSE);
// The free subunit is now marked as used,
// a configuration is possibly determined and,
// in this case, all the other virtual units are also
// marked as used. All the mask bits are stored in a
// temporary bit stream.
if (bDoAllPhase_1_Parts(k, clTempBitfield) == FALSE)
    return (FALSE);
// The second phase now starts: For all the
// instructions, the two, possibly one, source
// register(s) are determined and entered into the bit
// stream. A similar thing happens with the destination
// register, if present. The appropriate codings from
// the instruction are in the variables uiSourceReg1,
// uiSourceReg2 and uiDestReg, with constants possibly
// being recognizable as sources here.
if    (bDophase_2_CommonParts(k, clTempBitfield uiSourceReg1,
        uiSourceReg2, uiDestReg == FALSE)
    return (FALSE);
switch (uiMnemonicType)
{
case CONDITIONAL_COMMAND    // determine p-flag, entry for CU
case MOVEP_COMMAND:         // spec. first entry,
                            // second entry possible
}
vDoDataForwarding (uiSourceReg1, uiSourceReg2);
// The last action: the temporarily stored bit stream
// code is copied into the actual bit stream
vCopyBitfield (clBitfield, clTempBitfield)
return (TRUE);
```

The above central routine is called for each translatable instruction. The return value is TRUE if implementation has succeeded, otherwise it is FALSE. In the latter case, the instruction needs to be held in the calling program, since it has not been added, and the bit stream can be loaded for execution. The end of an implementation is thus indicated by the resources being exhausted or is obtained as a result of a nontranslatable instruction, such as a branch command.

As already mentioned above, the structure-procedural programming can be produced not only in software but also in hardware. One possible embodiment for producing it in hardware is explained below with reference to FIGS. 2 to 10. In doing this, an attempt has been made to have the individual phases running in parallel as far as possible.

The table-supported conversion calculations which arise when software is used are produced as so-called lookup tables (LUTs) when hardware is used. LUTs are configured to output data in response to the input of data, the output data being dependent on the input data. Such LUTs may, by way of example, be formed by an EPROM or another memory device. The input data are then used as an address, and the output data are the data which are stored under this address.

Figures 2, 3A, 3B:
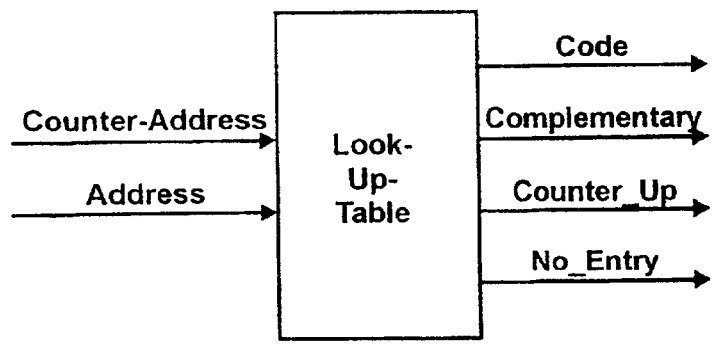
FIG. 2 is a block diagram of a lookup table used when the implementation is produced in hardware.
FIGS. 3A and 3B show the format of the data which are output from the lookup table shown in FIG. 2.

For the first phase, an LUT of the type illustrated in FIG. 2 is used. This LUT has two inputs (Address, Counter_Address) and four outputs (Code, Complementary, Counter_Up, No_Entry). The two inputs are used for addressing the LUT, the data and/or signals supplied via one input (Address) being dependent on the code which is to be translated, and the data and/or signals supplied via the other input (Counter_Address) being counter readings on a counter (counter array) which can be incremented through the use of the output Counter_Up. The outputs are used for outputting the translated code (Code), signals for incrementing the counter or counter array which generates the Counter_Address (Counter_Up), a signal for signaling the case that there is no other valid, free entry (No_Entry), and a signal (complementary) which is required for processing conditional move commands (movep), the translated code being made up of configuration bits (Config-Bits), a configuration index (Config-Index), and a part number (Part-Number). The lookup table entries for the first part thus have the format shown in FIG. 3A.

The aforementioned counter (the counter array) is used for marking (used, writing), with a separate counter existing for each operation type (addition, subtraction, etc.) The counter reading on the counter indicates what number of option can be used to carry out the associated operation type. The depth of the counters within this counter array depends on the number of options for carrying out the operation in question. If, by way of example, there are three addition options, the counter depth is two bits; in the corresponding LUT, which is, of course, addressed by the mnemonic code and the counter reading, there will then be a NO_ENTRY coding at the fourth position (counter reading 3), however, in order to indicate the absence of this operation; such an LUT entry is shown in FIG. 3B.

In the example under consideration, the counters are binary counters with asynchronous reset and enable. A 2-bit binary counter of this type is coded as below in the example under consideration; the illustration uses the DNF format customary for DNF (Disjunctive Normal Form) logic units. Counters of this type are called counters of a first type below.
BIT b0, b1:OUT;
BIT reset, enable:IN;
BIT clock: IN;
b0=/b0 * enable +b0* /enable;
b0.clk=clock;
b0.areset=reset;
b1=/b1 * b0 * enable +b1 * /b0 * enable +b1 * / enable;
b1.clk=clock;
b1.areset=reset;

In parallel with these counters, a memory array needs to be implemented for the conditional commands, in order to be able to store the code of the condition flag. As has already been explained above, this is necessary for assembling movep commands. Since only one CU instance is possible per flag (unlike in the case of the AU1, although there are generally a plurality of flags, they all differ in terms of the designation of the bit), the binary counter includes two bits, the first of which indicates the first assignment and the second of which indicates the complementary assignment. The correct CU is identified using the p-bits from the command.

The 2-bit binary counters for conditional move commands are coded as below in the example under consideration; the illustration again uses the DNF format customary for DNF (Disjunctive Normal Form) logic units. Counters of this type are called counters of a second type below.
BIT b0, b1:OUT;
BIT reset, enable:IN;
BIT clock:IN;
b0=/b0 * enable +b0;
b0.clk=clock;
b0.areset=reset;
b1=/b1 * b0 * enable +b1;
b1.clk=clock;
b1.areset=reset;

For the cases in which decisions need to be made, which are implemented as data paths, a specific logic unit is integrated.

Figure 4:
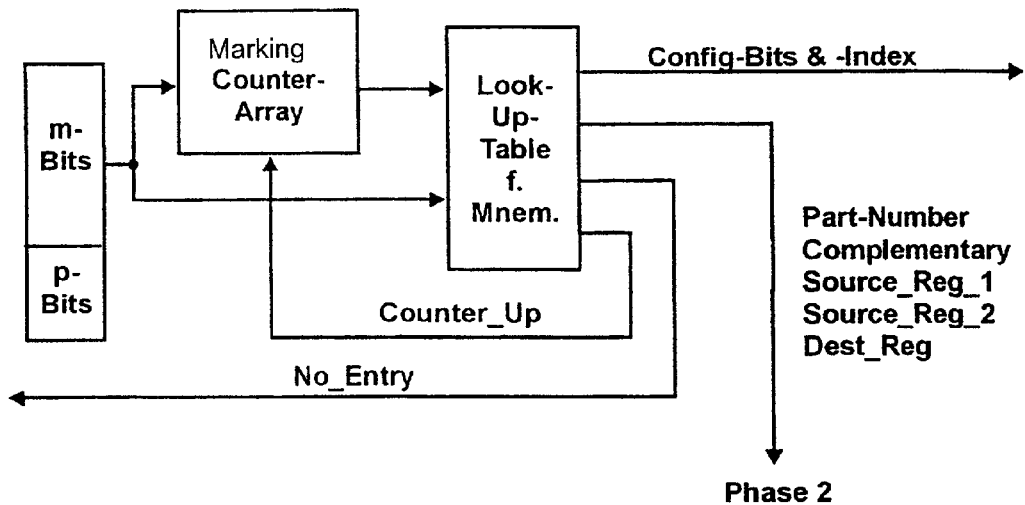
FIG. 4 is a block diagram of a circuit for selecting and configuring a hardware block subunit required for executing a command.

On the basis of all this, the embodiment shown in FIG. 4 is produced for the first phase of the method for hardware block structuring.

For all commands with the exception of the conditional movep instructions, a counter instance similar to the counter of the first type explained above is required for each arithmetic unit AU and for each comparison unit CU. Such a counter is sufficient because only a single used signal is required. The movep instructions, on the other hand, require a counter of the second type, which signals, in two bits, partial use (b0) and full use (b1). Conditional movep instructions referring to the same flag for the second time need to do this in inverted form (as compared with the first reference) and are then entered in the appropriate AU as a second source, while the first source register remains unchanged. This method can be integrated in an LUT; references to the uninverted conditions are terminated by No_Entry signaling.

The second phase includes determining the registers which are to be used as data and/or signal source(s) and data and/or signal destination for the operation in question. This takes place in parallel and largely identical form for all three possible registers. The coding of the respective register within the instruction is—if the field in question contains a valid entry—implemented as a mask for the bit stream together with the index in the bit stream by a lookup table.

Figure 5:
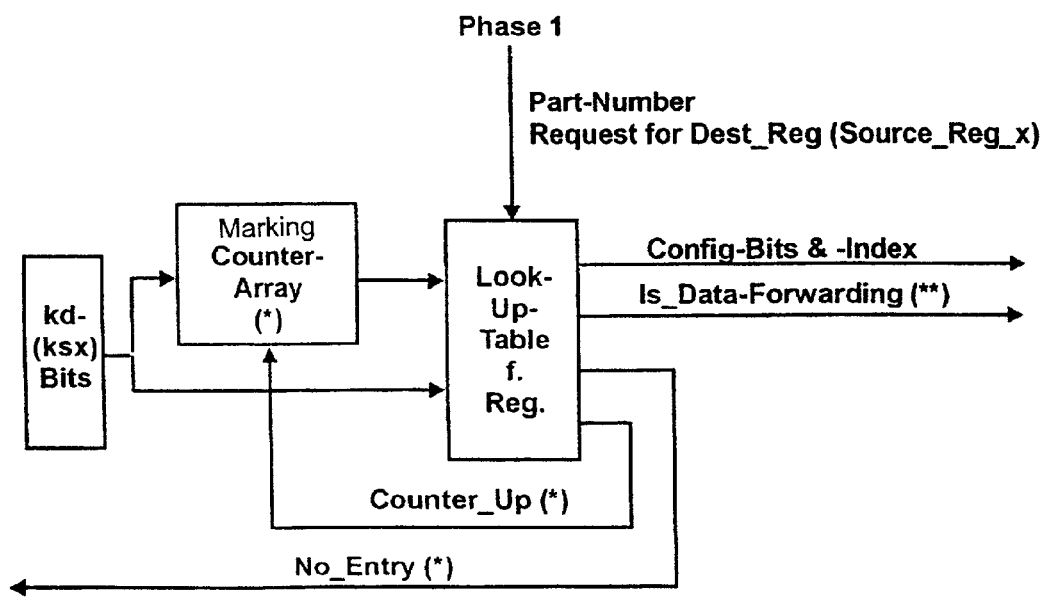
FIG. 5 is a block diagram of a circuit for defining the data and/or signal sources and the data and/or signal destinations for the subunit selected by the circuit shown in FIG. 4.

The block diagram of a circuit for determining and coding the registers which are to be used as data and/or signal source(s) and data and/or signal destination is shown in FIG. 5; which of the registers are actually (to be) implemented is identified by the control lines Source_Reg_1, Source_Reg_2 and Dest_Reg in the example under consideration (see FIGS. 4 and 5).

Source and destination registers are treated in different ways. In the case of a destination register, the entry is marked in order to be able to identify dual use (signal No_Entry) and in order to trigger data forwarding. These signals are dispensed with for source registers. In this case, straightforward generation of the bit stream entry is carried out, although generation of the code is dispensed with in the case of a constant and is moved to the stage described below.

FIG. 5 indicates what is relevant exclusively to source registers and exclusively to destination registers: parts identified by (*) are intended only for destination registers, and parts identified by (**) are intended only for source registers.

For a constant, which may arise within the coding instead of a source register, a parallel path is routed which compares the constant with the contents of all the constant registers in parallel with one another, and—in the event of inequality—assigns the constant to the next free register (pointer management by a counter) and returns this register as a coding or—in the event of equality—returns the coding of the constant register containing the constant as a coding.

For this purpose, the lookup table is configured such that it supplies the coding number of the register in question to the bit field immediately when there is a positive comparison, whereas, if there is no match, the constant is additionally stored and the register counter is incremented. The No_Entry signal becomes active if all the constants are being used, and ends the algorithm for an instruction block because the resources are exhausted. In addition, it should be noted that the constant registers are part of the (main) bit stream, since they may already be in use from previous cycles and are required for loading the instruction block.

Figure 6:
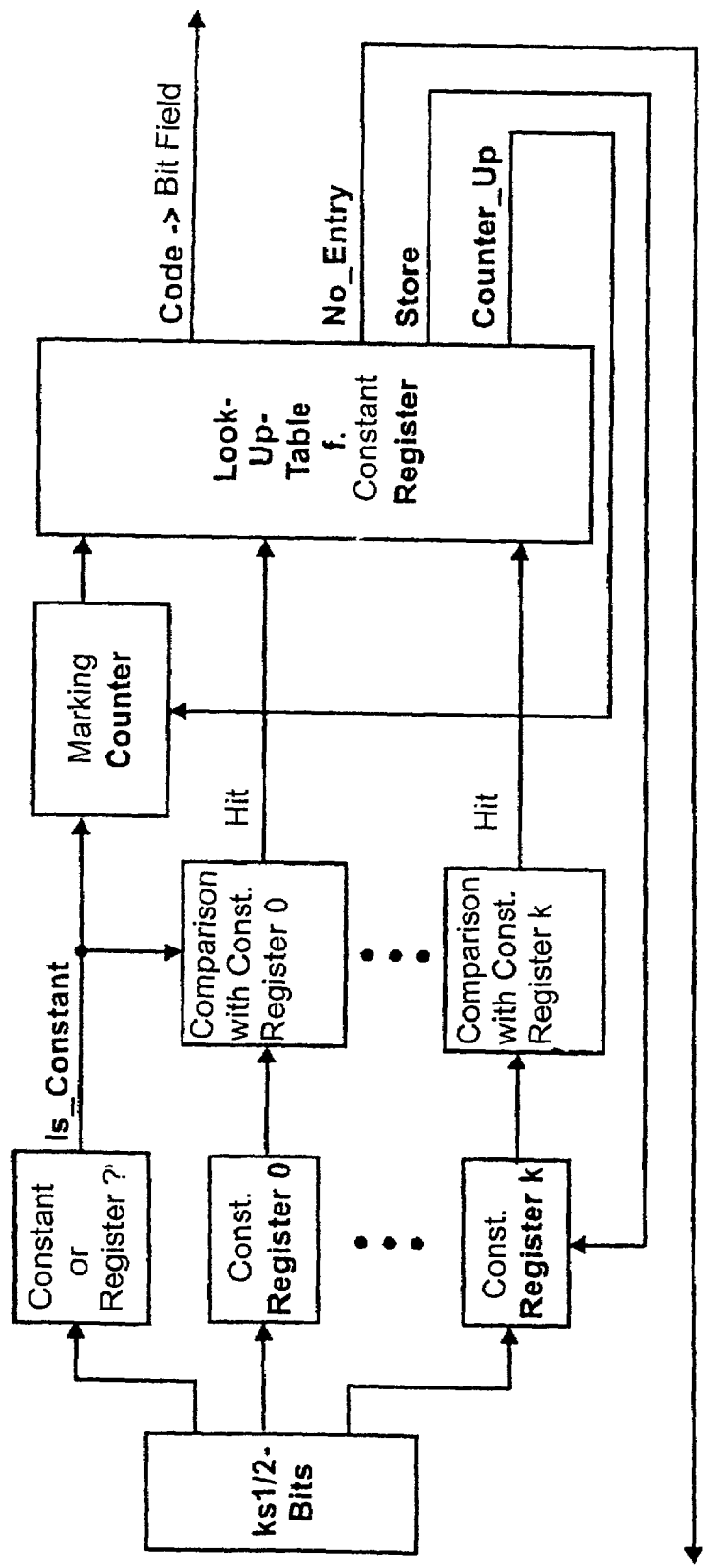
FIG. 6 shows is a block diagram of a circuit for handling constants contained in the commands which are to be implemented.

The block diagram for a circuit for allocating the constant registers is shown in FIG. 6.

For source registers, data forwarding (already mentioned more than once) is carried out. The entry in the used flag of the register, which entry indicates that this register has already been a destination register in this cycle, is used to decide whether the source register or the entry which can be ascertained as source for the destination register is actually being entered into the bit stream as a new source.

Figure 7:
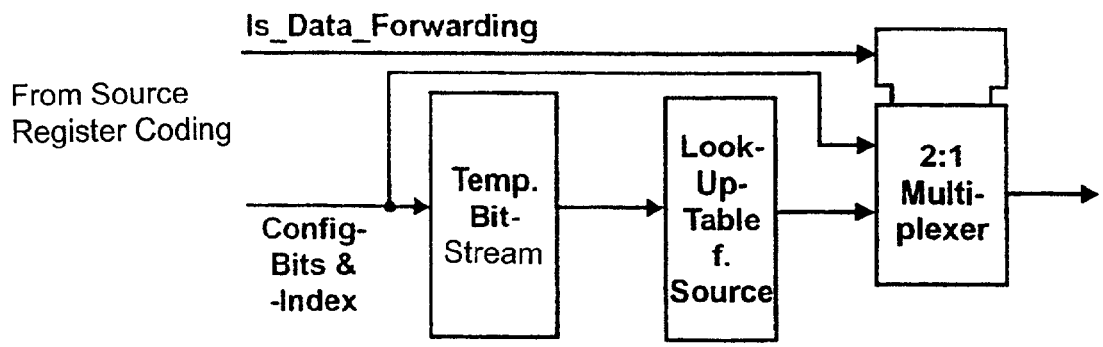
FIG. 7 is a block diagram of a circuit for carrying out a so-called data forwarding.

The block diagram for a circuit which is suitable for this is shown in FIG. 7.

The recoding of the new source carried out by LUT in FIG. 7 can be dispensed with if all the sources within the network are coded identically. This case, which may be assumed for a complete network, results in the source entry which is in the temporary bit stream for the (earlier) destination register being entered as new source coding for the current operation instead of the source register coded in the instruction. The selection is made in all cases by a multiplexer which is driven through the use of the Is_Data-Forwarding signal (see FIG. 5).

If all the operations are successful (this can be recognized from the occurrence of no No_Entry signaling), the temporary bit stream is ORed with the existing main bit stream during the write clock cycle and is written back to the main bit stream.

Figure 8:
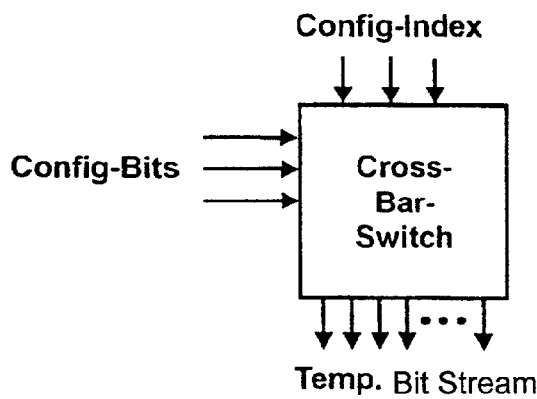
FIG. 8 is a block diagram of a so-called crossbar switch for writing the configuration data into a temporary bit stream.
Figure 9:
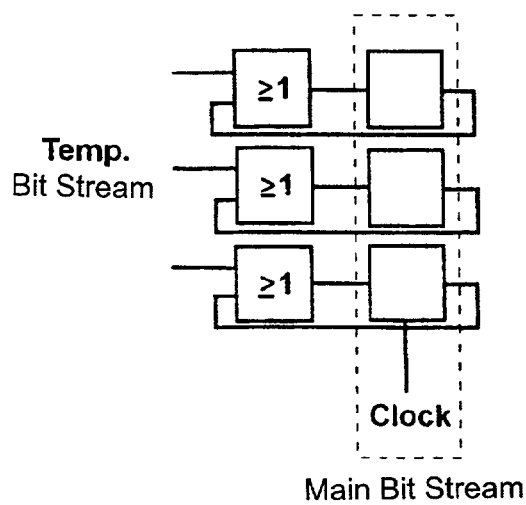
FIG. 9 is a schematic diagram of a configuration for channeling the temporary bit stream into a main bit stream.
Figure 10:
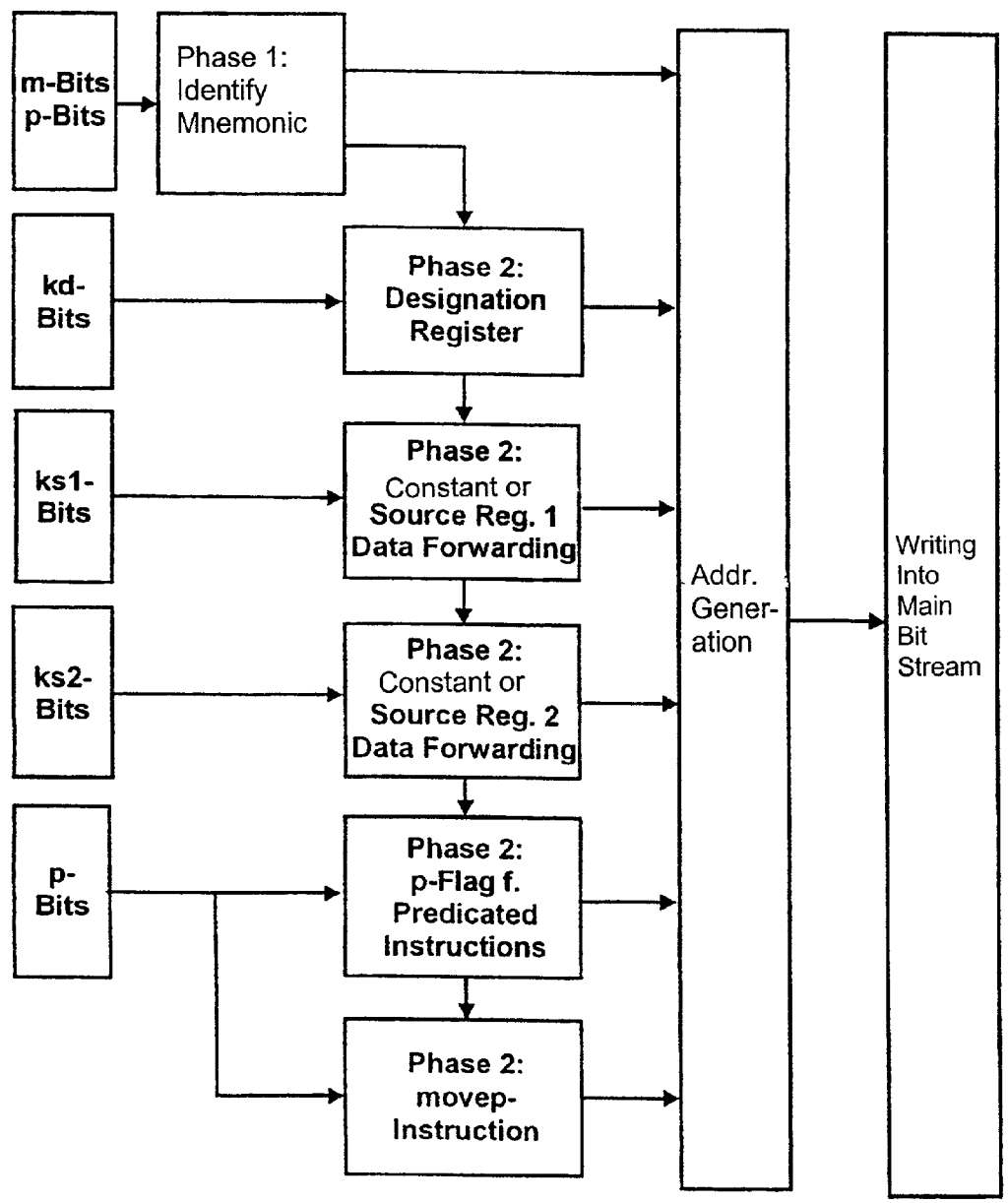
FIG. 10 is a block diagram of a complete configuration for implementing commands as configuration data for configuring the hardware block as desired.

FIGS. 8 and 9 show block diagrams for writing configuration data into the temporary bit stream and into the main bit stream.

As can be seen from FIG. 8, configuration data are written into the temporary bit stream using so-called crossbar switches. Crossbar switches are generally known and require no more detailed explanation. They route the configuration bits (Config-Bits) to the points defined by the Config-Index in the temporary bit stream, with unused outputs of the crossbar switch having a predetermined value (for example "0") assigned to them. For the mnemonic-based selection of a physical subunit, configuration thereof and allocation of the source and destination registers thereto, a respective dedicated crossbar switch as shown in FIG. 8 is required.

The temporary bit stream is converted to the main bit stream (the outputs of the crossbar switches are superimposed on the main bit stream) through the use of OR gates OR at the input of the main bit stream (see FIG. 9).

The components described above can be assembled as shown in FIG. 10 to form a configuration which is capable of implementing commands made up of m-bits, ks1-bits, ks2-bits, kd-bits and p-bits (see FIGS. 1A to 1D) as configuration data for configuring a hardware block, and of writing these data into a bit stream which can be used to configure the hardware block.

Finally, the sought-after implementation (the structure procedural programming) is also specified in mathematical notation.

To do this, a series of stipulations concerning the illustrations and depictions need to be made first.

| | |
|---|---|
| I* | is the quantity of all the instructions |
| I | is the quantity of all the instructions which are relevant to data flow (which are suitable for block execution) |

-continued

| | |
|---|---|
| SR | is the quantity of all the source registers, including NO-SOURCE representation, not including the constant registers |
| CR | is the quantity of all the constant registers, including the representations for NO CONST and IS_CONST |
| SR⁺ | is SR ∪ CR |
| DR | is the quantity of all the destination registers, including NO_DEST representation, not including the predicate bits |
| PR | is the quantity of all the predicate bits, including NO_PRED |
| DR⁺ | is DR ∪ PR |
| RN | is the set or quantity of all the registers, SR ∪ CR ∪ DR |
| RN⁺ | is the set or quantity of all the registers, including predicate bits, RN ∪ PR |
| List(pp) | is the set or quantity of all the possible values for the bit stream B as a 4-tuple (px ∈ PP. offset < k, nbit < k, bit value < $2^k - 1$), possibly dependent on pp ∈ pp |
| Nbit | is the set or quantity of all the possible bit values (for n bit data length: 0 . . . $2^n - 1$) |
| B | is the set or quantity of k binary entries as the bit stream for configuring the structure |
| OCC | is the set or quantity of all the use markings {FREE, WRITE, READ, READ_WRITE) |
| PP | is the set or quantity of all the physical subunits |
| PLNUM | is the set or quantity of all the unique numbers for the logical units |
| PL | is the set or quantity of all the logical subunits in a CB, including the 11-tuple (pl ∈ I ∪ RN*, plnum ∈ PLNUM, pp ∈ PP, occ ∈ OCC, source ∈ PLNUM, val ∈ Nbit, pbit ∈ PR, List(pp), confOffset ≦ k, confNumber < k, confValue < $2^k - 1$) |

The description below uses a few basic assumptions and functions which first need to be explained. The identifier within the component occ (for occurrence) was chosen to have four values in order to be able to identify the states 'not used' (FREE), 'used for reading' (READ), 'used for writing' (WRITE) and 'used for reading and writing' (READ_WRITE). In this context, the identifier 'used for reading' is possibly not evaluated further, but is still taken further within the description.

In addition, for the registers, it is assumed from RN that the logical and physical representations match for these subunits. This means that, unlike many a functional subunit (for example a configurable addition/subtraction unit which is represented as two logical units but can, of course, only be used once), no configuration need be carried out for registers, and that infective mapping (although not bijective) exists between the register number rn ∈ RN and the logical subunit number plnum ∈

PLNUM, the mapping being called rn2plnum( ) below. This assumption is not true for predicate bits as destination bits.

Under these prerequisites, the implementation of commands as structure information for structuring hardware blocks can be paraphrased as follows:

1. In the first phase, each instruction, including all the operands, is transferred from the original binary format to a description bi= (i∈I, sr1∈SR, cr1∈CR, n1∈Nbit, sr2∈SR, cr2∈CR, n2∈Nbit, dr∈DR, pr_source∈PR, pr_dest∈PR). In this description, for a constant, the identifier IS_CONST is entered for cr1 and cr2, and the constant value is entered in n1/n2, with the appropriate source register receiving the identifier NO_SOURCE in this case. Accordingly, for predicate commands (for example pge . . . ), NO_DEST is used for dr, while pr_dest then holds the number of the predicate bit.

For predicated instructions (for example movep), pr_source, rather than pr_dest, is set to an appropriate value in order to improve distinguishability.

An instruction with j∉I ends the implementation.

2. In the second phase, a maximum of five entries in bi are translated into a configuration. Five, because some combinations exclude one another. In this regard, a distinction is drawn for the individual parts:

For instructions bi→i∈I and bi→pr_dest==NO_PRED (no predicate instruction), the first element pl∈PL is sought which covers this i and has occ==FREE. If this cannot be found, the implementation is ended.

If pl is found, then all the elements from PL which are mapped to the same physical element pp∈PP are assigned occ==READ_WRITE. The configuration for pl is entered into the bit stream B using the information present in the tuple.

If bi→pr_source==NO_PRED, then no entry is made for this. Otherwise, a p2∈PL with p2→pbit==bi→pr_source is sought, where p2→occ==WRITE must be true. For this p2, pl is sought via List(p2→pp), and the entry in the bit stream is made; in addition, p2→occ is set to READ_WRITE.

For instructions bi→i∈I and bi→pr_dest!=NO_PRED (predicate instruction), the first element pl∈PL is sought which covers this i and has occ==FREE. If this cannot be found, then the implementation is ended.

If pl is found, then all the elements from PL which are mapped to the same physical element pp∈PP are assigned occ=WRITE. The configuration for pl is entered into the bit stream B using the information present in the tuple.

For all instructions i∈I, the following is true: for bi→sr1 and bi→sr2, for which !=NO_SOURCE is true, the appropriate configuration is set in the bit stream B by List (pl→pp) if pl1→occ—FREE and pl2→occ==FREE are true for the pl1/l2∈PL associated with sr1/2; in addition, pl→plnum is entered for pl1/l2→source (for later forwarding). If this is not the case, phase 3 (data forwarding) is carried out.

For the source registers bi→sr1 and bi→sr2, if these are !=NO_SOURCE, the appropriate entries for the associated p31 and p32∈PL (available via the specified function rn2plnum( )) p31→occ and p32→occ are set to READ in PL if these were previously !=WRITE and !=READ_WRITE, otherwise they are set to READ_WRITE.

For the constant registers cr1 and cr2, if these are !=NO_CONST, a check is first carried out for all p3∈PL to determine whether p3→pp∈CR, p3→occ==READ_WRITE and p3→val==bi→n1/2 are true. If this is the case, the entry for p3 is made on the basis of the method for a source register.

If this search is unsuccessful, it is necessary to search for a p3∈PL for which p4→pp∈CR and p4→occ==FREE are true. If this is found, bi→n1/2 is entered in p4→val, and p4→occ=READ_WRITE is set, and the entry is continued as for a source register. If the search is unsuccessful, the implementation is ended.

For the destination register dr, a check is carried out to determine whether the condition p5→occ==FREE or READ is true for the appropriate entry p5 with p5→pp==dr. If this is not the case, the implementation is ended, otherwise p5→occ=WRITE or READ_WRITE is set and the entry in List(p5→opp) is transferred to the bit stream B. For any data forwarding, p5→source=p1 (logical element of the beneficial instruction) is entered.

3. For all source registers sr∈SR which have the value for the associated element p6∈PL and the value p6→occ==WRITE or READ_WRITE in phase 2, data forwarding is carried out by entering in the bit stream B not the values from List(p6), but rather from List (p6→source).

The generation of configuration data as described above can result in commands from normal programs, i.e. from programs configured to be executed in program-controlled units operating on the basis of the Von Neumann principle (conventional microprocessors, micro-controllers etc.), being executed in configurable hardware blocks.

In this case, the manner of implementation allows both implementation of the commands as the configuration data and hardware block configuration using these configuration data to be effected particularly quickly, simply and efficiently.

The described implementation of commands as configuration data creates a sequence of configuration data records, where firstly, as many commands as possible in each case are implemented as a configuration data record, and secondly, only as many commands are in each case implemented as a configuration data record as can be executed by the hardware block resources which are available at the time that the hardware block is (re) configured.

This makes it possible to ensure that the hardware blocks are used with maximum efficiency with a minimum number of reconfiguration operations on the hardware block and without any complicated and error-prone checks before the configuration data are used.

This is particularly (but undoubtedly not exclusively) true when a hardware block of the type shown in FIG. 12 of the present application is used and is respectively fully reconfigured by the respective configuration data records.

A hardware block of this type which is configured using a configuration data record generated as claimed executes the commands implemented as the respective configuration data record in parallel. If the hardware block has executed the commands implemented as the respective configuration data record, which the hardware block preferably signals (for example through the use of the aforementioned READY signal or in another manner), the hardware block is reconfigured using the next configuration data record, as a result of which the next commands (the operations which need to be carried out to execute them) are executed in the hardware block. This next configuration data record used to carry out reconfiguration results from the next commands being implemented as described above or in a similar manner. When these next commands have been executed, the hardware block is reconfigured again. The aforementioned procedures are then repeated.

In this manner, programs configured to be executed in program-controlled units operating on the Von Neumann principle can be executed quickly (much more quickly than in conventional program-controlled units, particularly on account of the at least partial parallel command execution) and simply in configurable hardware blocks.

For the above-described implementation of commands as configuration data, hyperblock-based implementation, i.e. implementation in which precisely one hyperblock is implemented as a configuration data unit, is regarded as the desirable aim.

It would, of course, be even better if more than one hyperblock could be implemented as a configuration data record; it would then be possible to execute the maximum number of commands at the same time in each case. This is actually possible under certain circumstances.

In particular, in the case of hardware blocks of the type shown in FIG. 12 (in the case of hardware blocks which can execute the aforementioned predicate commands), it is possible to implement the hyperblocks 0, 1 and 2 of the sequence:

hyperblock_0;
  if (condition)
  hyperblock_1;
  else
  hyperblock_2 as a single configuration data record. This is made possible by the aforementioned if conversion. In this context, the condition can be implemented as a p-flag, and execution of the commands which are to be executed on the basis of this condition can be made dependent on the value of the p-flag. In this case, it is possible to provide, by way of example, for the commands contained in the if branch (hyperblock_1) to be executed when the p-flag has the value 1, and for the commands contained in the else branch (hyberblock_2) to be executed when the inverse p-flag has the value 1. In this way, a pseudo-hyperblock including the three hyperblocks 0, 1 and 2 can be formed from these hyperblocks and can be implemented as a single configuration data record.

For its part, such a pseudo-hyperblock can again contain one or more pseudo-hyperblocks. An example of this is the sequence hyperblock_0;
  if (condition)
  pseudo-hyperblock_1;
  else
  pseudo-hyperblock_2;

In this case, a pseudo-hyperblock which includes the hyperblock 0 and the pseudo-hyperblocks 1 and 2 can be formed.

Implementation of commands as configuration data therefore involves attempting to form pseudo-hyperblocks where possible in a first step. This requires examining the program structure to determine whether pseudo-hyperblocks can be formed, and carrying out an if conversion for the program parts which can be used to form pseudo-hyperblocks.

In certain cases, particularly when a configurable hardware block is intended to produce "just" one particular circuit (for example a serial interface), it may prove to be advantageous if the hardware block is configured using a circuit definition produced in a circuit description language, such as VHDL. In this regard, the circuit intended to be produced by the hardware block is first defined in a circuit description language, and the code obtained in this process is then implemented as the configuration data (as the configuration data record or the configuration data record sequence) which needs to be used to configure the hardware block in order for the hardware block to conform to the circuit which it is intended to produce. In this case, the hardware block is preferably configured such that it can produce various circuits, depending on configuration, and/or such that commands implemented as configuration data as described above can also be executed in it.

The above illustrations and production options refer in each case to a hardware block of the type shown in FIG. 12. It ought to be clear that there is no restriction to this. The described configuration data generation can also be carried out for modified or extended hardware blocks. In this context, both the configuration data generation and the configuration of the hardware block using these configuration data can be carried out quickly, simply and efficiently. Nevertheless, the components of the hardware block are utilized in optimum fashion in this context, which allows an extremely efficient operation of the hardware block.

We claim:

1. A method for configuring a configurable hardware block, the method which comprises:
   configuring the hardware block using configuration data resulting from the implementation of commands or command sequences of a program which is to be executed, the implementation of the commands or command sequences including the following steps:
   ascertaining a given type of subunit of a configurable hardware block, the given type of subunit being required for executing a respective command;
   selecting, if available, a subunit of the given type of subunit;
   configuring configurable connections provided around the subunit selected in the selecting step, if the subunit of the given type of subunit is found in the selecting step;
   checking if a destination, selected from the group consisting of a data destination and a signal destination defined by a command to be implemented, is a memory area having information written thereto also by a further subunit of the configurable hardware block, and performing the checking step when configuring the configurable connections provided around the subunit selected in the selecting step, for connecting the subunit to the destination;
   using another memory area as the destination, if the destination defined by the command to be implemented is found to be a memory area which also has information written thereto by another subunit of the configurable hardware block; and
   carrying out a register renaming process, as used for superscalar processors, for memory areas representing a same destination.

2. The method according to claim 1, which comprises starting the implementing step with a first command of a command block having only one entry point and one exit point.

3. The method according to claim 2, which comprises performing the implementing step on a hyperblock basis.

4. The method according to claim 1, which comprises automatically ending the implementing step when a last command in a command block having only one entry point and one exit point has been implemented.

5. The method according to claim 4, which comprises performing the implementing step on a hyperblock basis.

6. The method according to claim 1, which comprises automatically ending the implementing step if a hardware block component required for the implementing step is not available.

7. The method according to claim 1, which comprises automatically ending the implementing step if a hardware block component required for the implementing step is no longer available.

8. The method according to claim 1, which comprises assigning virtual units to functionally configurable physical subunits of the configurable hardware block, the virtual units representing functions which can be imparted to the functionally configurable physical subunits by respectively configuring the functionally configurable physical subunits.

9. The method according to claim 8, which comprises entering the virtual units of all functionally configurable physical subunits of the configurable hardware block in a record selected from the group consisting of a table and a list.

10. The method according to claim 9, which comprises providing the record with entries including information about associations between the functionally configurable physical subunits and the virtual units respectively assigned thereto.

11. The method according to claim 9, which comprises providing the record with entries including information about how the functionally configurable physical subunits need to be configured for imparting the functions represented by the virtual units.

12. The method according to claim 1, which comprises selecting a physical subunit required for executing a command by searching for a virtual unit of a required type.

13. The method according to claim 1, which comprises ensuring that a virtual unit of a required type selected for a use and that virtual units associated with a same physical subunit as the virtual unit selected for the use can no longer be selected for use in subsequent implementations.

14. The method according to claim 1, which comprises checking whether a source, selected from the group consisting of a data source and a signal source and the source being defined by a command to be implemented, is a memory area previously having information written thereto by subunits of the configurable hardware block, and performing the checking step when configuring the configurable connections provided around the subunit selected in the selecting step, for connecting the subunit to the source.

15. The method according to claim 14, which comprises using a given one of the subunits as the source, if the source defined by the command to be implemented is found to have had information written thereto by the given one of the subunits of the configurable hardware block.

16. The method according to claim 1, which comprises:
carrying out a search for a memory area designated for constants and containing a given constant, if a command to be implemented includes the given constant; and
using the memory area designated for constants as a source selected from the group consisting of a data source and a signal source.

17. The method according to claim 16, which comprises:
storing the given constant in a new memory area designated for constants, if the given constant is not already stored in existing memory areas designated for constants; and
using the new memory area as the source.

18. The method according to claim 1, which comprises attempting to form pseudo-hyperblocks including a plurality of hyperblocks when implementing commands as configuration data.

19. The method according to claim 18, which comprises forming the pseudo-hyperblocks by using an if-conversion.

20. The method according to claim 18, which comprises implementing commands as configuration data on a pseudo-hyperblock basis if possible.

* * * * *